Patented Dec. 31, 1929

1,742,042

UNITED STATES PATENT OFFICE

OTTO MATTHIES, WALTER DIETERLE, AND BRUNO WENDT, OF DESSAU IN ANHALT, GERMANY, ASSIGNORS, BY MESNE ASSIGNMENTS, TO AGFA ANSCO CORPORATION, OF BINGHAMTON, NEW YORK, A CORPORATION OF NEW YORK

SENSITIZED ELEMENT, SILVER HALID EMULSION THEREFOR, AND PROCESS OF MANUFACTURING THE SAME

No Drawing. Application filed January 5, 1928, Serial No. 244,768, and in Germany January 7, 1927.

The present invention relates to sensitized elements, to highly sensitive photographic silver salt emulsions, to photographic materials containing such emulsions and to a process of preparing the same. Its object is to increase the light-sensitiveness of these emulsions by the addition of certain organic compounds.

We have found that the sensitiveness of photographic silver salt emulsions, especially of emulsions which are not alkaline at any stage of their production (so-called "boiled emulsions"), can be increased by adding thereto a small quantity of an organic compound containing at least one singly linked sulfur atom and being capable of reacting upon the silver salts contained in the emulsion with the gradual formation of silver sulfide or with the formation of sparingly soluble salts which gradually decompose by themselves. Both open chain and cyclic compounds having singly linked sulfur are applicable in so far as they yield gradually silver sulfide by the reaction upon the silver salt.

The efficaciousness of the bodies in question is not dependent on the alkalinity of the medium. Sulfur compounds which do not form silver salts capable of decomposition are not active, for instance many mercapto compounds. The gradual decomposition of the silver compound or the gradual formation of the silver compound which decomposes as soon as it is formed is particularly favourable for the present purpose since only by a gradual course of reaction is fogging of the emulsion, such as occurs with thiourea in alkaline solution (compare "Photographic Journal" 65, 8, 380, 1925) or with sodium sulfide in acid or alkaline solution, avoided.

There follows a number of bodies having the power of increasing sensitiveness in the sense of this invention:

1. Organic disulfides of acid character, for instance disulfide of acetic acid

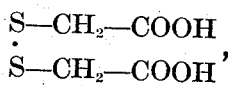

dithiodilactylic acid

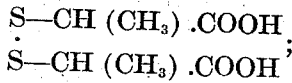

2. Organic sulfhydryl-compounds or their salts, for instance thiomalic acid

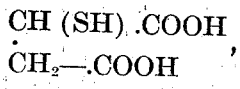

potassium dithiocyanate

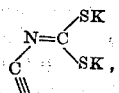

phenyl-β-β-dimercapto-vinylketone

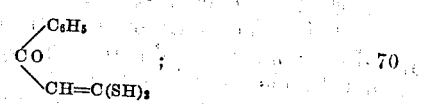

3. Organic compounds having sulfur in the ring, and from which such sulfur is split off in the form of silver sulfide by the action of silver salts, for instance disulfide of β-mercaptothiocinnamic acid

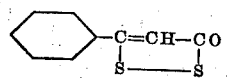

or phenylthiobiazolinsulfhydrate

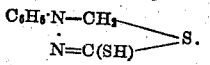

The process is not, however, limited to the use of these compounds which are named only as examples.

The following example further illustrates the invention:

720 grams of potassium bromide and 40 grams of potassium iodide are dissolved in 4 litres of water at the ordinary temperature and there is added a solution of 300 grams of gelatine in 1 litre of water. At a temperature of 60–70° C. there is run in a solution of 1000 grams of silver nitrate in 10 litres of water; there is then added a solution of 2300 grams of gelatine in 9 litres of water containing 15 milligrams of potassium dithiocyanate. The ripening process is finished at the same temperature in about 1½ hours, whereupon the emulsion is allowed to solidify, cut up and washed. It is then ready for pouring. In this manner without varying the size of grain, there is obtained an increase of sensitiveness amounting to 30–50-fold as compared with an emulsion which is made by the same process without the addition of potassium dithiocyanate.

Since, as above explained, the activity of the bodies named does not depend upon the alkalinity of the medium these bodies may also be used in emulsions of alkaline type for increasing sensitiveness. The addition of the sensitizing bodies may be made at any step of the manufacture of the emulsion or of its constituents, e. g. of the gelatine to be employed in the emulsion.

We claim:

1. The process which comprises incorporating in a photographic silver salt emulsion at any step of its manufacture a small quantity of an organic compound containing at least one singly linked sulfur atom and being capable of reacting upon the silver salts contained in the emulsion with the gradual formation of silver sulfide.

2. The process which comprises incorporating in a photographic silver salt emulsion at any step of its manufacture a small quantity of an organic compound containing at least one singly linked sulfur atom and being capable of reacting upon the silver salts contained in the emulsion with the formation of sparingly soluble silver compounds which decompose by themselves.

3. The process which comprises incorporating in a photographic silver salt emulsion at any step of its manufacture a small quantity of an organic compound containing at least one singly linked sulfur atom and being capable of reacting upon the silver salts contained in the emulsion with the gradual formation of sparingly soluble silver compounds which decompose as soon as they are formed.

4. The process which comprises incorporating in a photographic silver salt emulsion at any step of its manufacture a small quantity of potassium dithiocyanate.

5. As an article of manufacture photographic silver salt emulsions in which is incorporated at any step of its manufacture a small quantity of an organic compound containing at least one singly linked sulfur atom and being capable of reacting upon the silver salts contained in the emulsion with the gradual formation of silver sulfide.

6. As an article of manufacture photographic silver salt emulsions in which is incorporated at any step of its manufacture a small quantity of an organic compound containing at least one singly linked sulfur atom and being capable of reacting upon the silver salts contained in the emulsion with the formation of sparingly soluble silver compounds which decompose by themselves.

7. As an article of manufacture photographic silver salt emulsions in which is incorporated at any step of its manufacture a small quantity of an organic compound containing at least one singly linked sulfur atom and being capable of reacting upon the silver salts contained in the emulsion with the gradual formation of sparingly soluble silver compounds which decompose as soon as they are formed.

8. As an article of manufacture photographic silver salt emulsions in which is incorporated at any step of its manufacture a small quantity of potassium dithiocyanate.

9. As an article of manufacture a suitable carrier coated with a light-sensitive emulsion as defined in claim 5.

10. As an article of manufacture a suitable carrier coated with a light-sensitive emulsion as defined in claim 6.

11. As an article of manufacture a suitable carrier coated with a light-sensitive emulsion as defined in claim 7.

12. As an article of manufacture a suitable carrier coated with a light-sensitive emulsion as defined in claim 8.

In testimony whereof, we affix our signatures.

OTTO MATTHIES,
WALTER DIETERLE.
BRUNO WENDT.